(12) United States Patent
Shenkler

(10) Patent No.: US 10,412,465 B2
(45) Date of Patent: Sep. 10, 2019

(54) SYSTEM AND METHOD FOR CONTROLLING PLAYBACK OF DIGITAL CONTENT

(71) Applicant: SONY CORPORATION, Tokyo (JP)

(72) Inventor: Andrew Shenkler, Marina Del Ray, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/176,926

(22) Filed: Jun. 8, 2016

(65) Prior Publication Data

US 2016/0360286 A1 Dec. 8, 2016

Related U.S. Application Data

(60) Provisional application No. 62/172,593, filed on Jun. 8, 2015.

(51) Int. Cl.

| | |
|---|---|
| *H04L 29/08* | (2006.01) |
| *H04N 21/81* | (2011.01) |
| *H04N 21/258* | (2011.01) |
| *H04N 21/436* | (2011.01) |
| *H04N 21/442* | (2011.01) |
| *H04N 21/472* | (2011.01) |
| *H04N 21/475* | (2011.01) |
| *H04N 21/658* | (2011.01) |
| *H04N 21/6543* | (2011.01) |
| *H04N 21/6547* | (2011.01) |

(52) U.S. Cl.
CPC ....... *H04N 21/6543* (2013.01); *H04L 67/306* (2013.01); *H04N 21/25866* (2013.01); *H04N 21/43615* (2013.01); *H04N 21/44204* (2013.01); *H04N 21/44213* (2013.01); *H04N 21/475* (2013.01); *H04N 21/47217* (2013.01); *H04N 21/6547* (2013.01); *H04N 21/6582* (2013.01); *H04N 21/812* (2013.01)

(58) Field of Classification Search
CPC .................................................. H04N 21/6543
See application file for complete search history.

(56) References Cited

U.S. PATENT DOCUMENTS

| | | | |
|---|---|---|---|
| 8,601,516 B2 | 12/2013 | Averbuch | |
| 2001/0000169 A1* | 4/2001 | Oba | G06F 21/6245 455/557 |

(Continued)

FOREIGN PATENT DOCUMENTS

WO 2002050744 A 6/2002

*Primary Examiner* — Nasser M Goodarzi
*Assistant Examiner* — Adil Ocak
(74) *Attorney, Agent, or Firm* — Chip Law Group

(57) ABSTRACT

Various aspects of a system and method to control playback of digital content are disclosed herein. In accordance with an embodiment, the system includes a first electronic device, which is configured to pair the first electronic device with a unique user account in a server. The pairing is performed by use of an application embedded in a physical storage medium. User viewing information, associated with a content item currently played through the physical storage medium, is communicated by the first electronic device to the server. The playback of the content item is resumed on login to the unique user account on a second electronic device from a last view state of the content item played through the physical storage medium by the first electronic device.

20 Claims, 11 Drawing Sheets

(56) References Cited

U.S. PATENT DOCUMENTS

| | | | | |
|---|---|---|---|---|
| 2012/0148217 | A1* | 6/2012 | Ellis | H04H 60/31 |
| | | | | 386/297 |
| 2012/0324076 | A1* | 12/2012 | Zerr | H04W 4/206 |
| | | | | 709/223 |
| 2014/0105561 | A1* | 4/2014 | Chen | H04N 21/647 |
| | | | | 386/200 |
| 2014/0325561 | A1* | 10/2014 | Allen | H04N 21/2393 |
| | | | | 725/38 |
| 2015/0281322 | A1* | 10/2015 | Dingwell | H04L 67/025 |
| | | | | 705/26.82 |

* cited by examiner

SYSTEM AND METHOD FOR CONTROLLING PLAYBACK OF DIGITAL CONTENT

CROSS-REFERENCE TO RELATED APPLICATIONS/INCORPORATION BY REFERENCE

This application claims priority to U.S. Provisional Patent Application Ser. No. 62/172,593 filed on Jun. 8, 2015, the entire content of which is hereby incorporated by reference.

FIELD

Various embodiments of the disclosure relate to a system and method to control playback of digital content. More specifically, various embodiments of the disclosure relate to a system and method to control playback of digital content among multiple electronic devices.

BACKGROUND

Recent advancements in the field of digital technology and also laser and optics technology have led to the development of various ways and means to view digital content through various online and offline platforms. In certain scenarios, a user may play digital content stored locally in a storage medium, such as a Blu-ray disc, by use of an electronic device. The user may then desire to switch to another electronic device or viewing platform, such as a website, to watch the same digital content online through a digital content streaming service provider. In such a switching from viewing the digital content stored locally in the storage medium to the online platform, a seamless viewing experience may not be provided to the user. Consequently, a seamless integration between the various offline and online platforms may be needed to enable smart synchronization of playback of digital content across various electronic devices and viewing platforms to enhance viewing experience.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A system and method to control playback of digital content is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
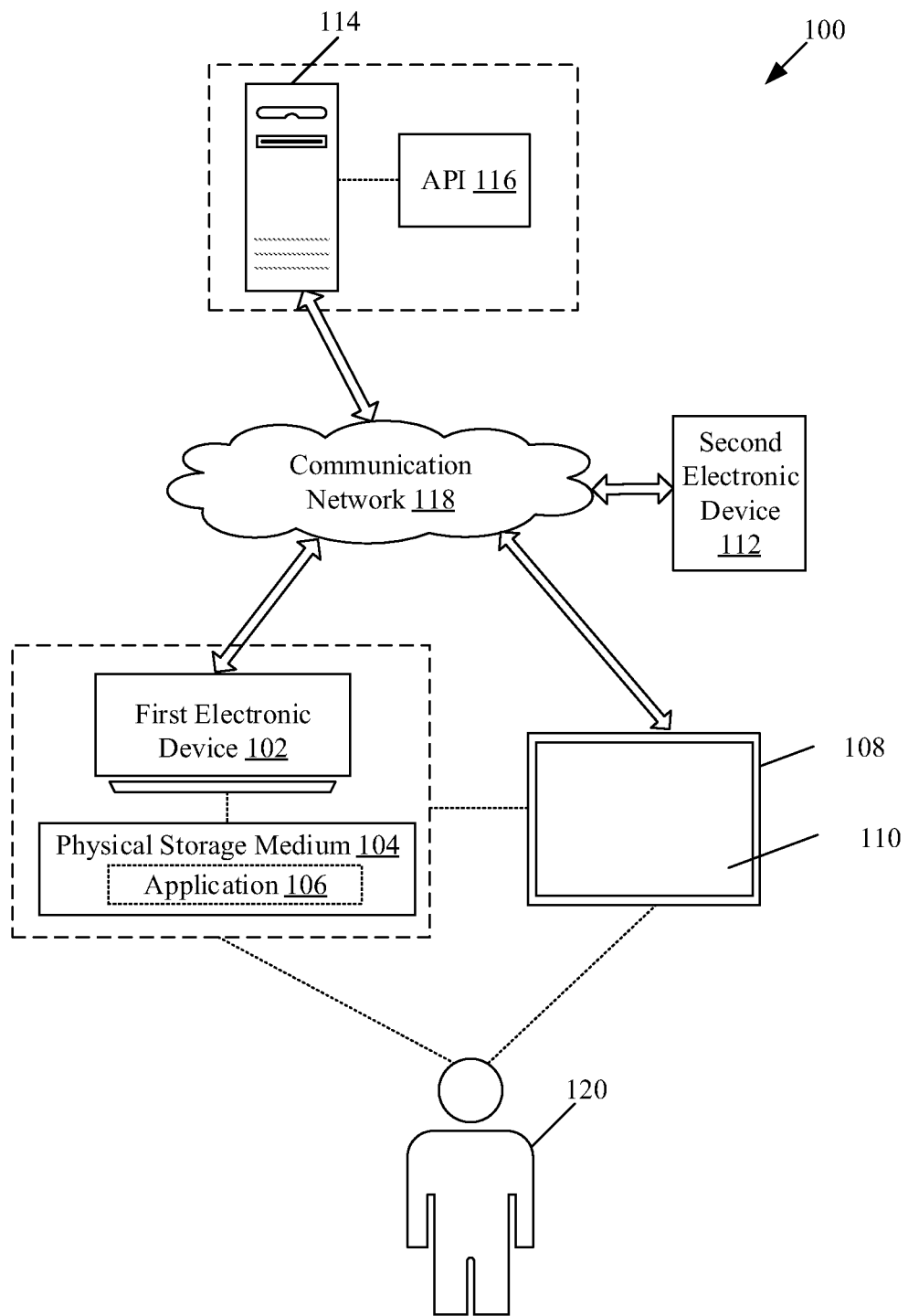
FIG. 1 is a block diagram that illustrates a network environment to control playback of digital content, in accordance with an embodiment of the disclosure.

Various implementations may be found in a system and/or a method to control playback of digital content. Exemplary aspects of the disclosure may include a method to pair a first electronic device with a unique user account in a server. The pairing may be performed by use of an application embedded in the physical storage medium. User viewing information, associated with a content item currently played through the physical storage medium may be communicated by the first electronic device, to the server. The playback of the content item may be resumed on login to the unique user account on a second electronic device from a last view state of the content item played through the physical storage medium by the first electronic device.

In accordance with an embodiment, the first electronic device may correspond to a Blu-Ray disc player, a media player device, or a gaming device. A unique pairing code may be received by the first electronic device from the server for the pairing. The received unique pairing code may be displayed on a display screen through an application embedded in the physical storage medium. The display screen may be communicatively coupled to the first electronic device.

In accordance with an embodiment, the first electronic device may be configured to generate the user viewing information associated with one or more content items played through the physical storage medium at pre-determined time intervals. The generated user viewing information may be periodically or aperiodically communicated to the server to update the user viewing information for the unique user account at the server. The user viewing information may include an identifier (ID) of the first electronic device, an ID of the content item, an ID of the physical storage medium, a timestamp, a viewing session value, view state information, and/or current timing information associated with the content item currently played through the physical storage medium. The user viewing information may further include one or more viewing progress values based on input received from a user related to start, pause, fast forward, rewind, and/or stop events. The first electronic device may be configured to play a new content item received from the server through the physical storage medium by dynamically updating the application embedded in the physical storage medium.

In accordance with an embodiment, the new content item received from the server may include, for example, a dynamic advertising, a promotional content, menu update information, and/or one or more other content items different from content items pre-stored in the physical storage medium. In accordance with an embodiment, the first electronic device may be configured to play the new content item utilizing one or more graphical placeholders on an interface of the application embedded in the physical storage medium.

In accordance with an embodiment, the first electronic device may be further configured to dynamically change, and/or reconfigure a menu navigation system of the application embedded in the physical storage medium, based on instructions received from the server.

Another exemplary aspect of the disclosure may include a server, which may receive a request for pairing from the first electronic device using an interface of the server. A pairing code may be communicated to the first electronic device to enable pairing of the first electronic device with a unique user account in the server. The first electronic device may be associated with a physical storage medium. User viewing information, associated with a content item played through the physical storage medium may be received by the server from the first electronic device. The content item may be streamed to a second electronic device on login to the unique user account from the second electronic device. The content item may be streamed to the second electronic device to enable resuming playback of the content item on the second electronic device from a last view state of the content item played through the physical storage medium by the first electronic device.

In accordance with an embodiment, the server may be configured to generate a unique paring code to be communicated to the first electronic device to enable the pairing with the first electronic device. The server may be further configured to communicate a response to the first electronic device related to a pairing status of the first electronic device with the server. The server may be further configured to communicate a new content item to the first electronic device to remotely update the application embedded in the physical storage medium of the first electronic device to enable playback of the new content item through the physical storage medium of the first electronic device.

In accordance with an embodiment, the new content item may communicated to the first electronic device may include, for example, a dynamic advertisement, a promotional content, menu update information, and/or one or more other content items different from content items pre-stored in the physical storage medium of the first electronic device. The server may be further configured to determine a usage pattern associated with the physical storage medium. The usage pattern may be determined, based on the received user viewing information from the first electronic device. The server may be further configured to communicate instructions to the first electronic device to update a menu navigation system of the application embedded in the physical storage medium.

FIG. 1 is a block diagram that illustrates a network environment to control playback of digital content, in accordance with an embodiment of the disclosure. With reference to FIG. 1, there is shown a network environment 100. The network environment 100 may include a first electronic device 102. A physical storage medium 104 may be associated with the first electronic device 102. The physical storage medium 104 may include an application 106. The network environment 100 may further include a display device 108. An application interface 110 that corresponds to the application 106 may be rendered on the display device 108.

The network environment 100 may further include a second electronic device 112, a server 114, an application programming interface (API) 116, a communication network 118, and one or more users, such as the user 120. The first electronic device 102 may be communicatively coupled to the display device 108 and the server 114, via the communication network 118. The second electronic device 112 may also be communicatively coupled to the server 114, via the communication network 118. It should be understood by one skilled in the art that the various embodiments are not limited to the API 116. Accordingly, other suitable interface such as one or more protocol interfaces may be utilized without departing from the spirit and scope of the disclosure.

The first electronic device 102 may comprise suitable logic, circuitry, interfaces, and/or code that may be configured to control playback of digital content. The first electronic device 102 may further be configured to operate the physical storage medium 104 associated with the first electronic device 102. Examples of the first electronic device 102 may include, but are not limited to, a Blu-Ray Disc (BD) player, a media player device, and/or a gaming device.

In accordance with an embodiment, the physical storage medium 104 may be an application based storage medium, where the digital content stored in the storage medium may be played via an application, such as the application 106, embedded in the physical storage medium 104. Examples of the physical storage medium 104 may include, but are not limited to, a Blu-Ray technology based digital optical disc data storage format, such as a Blu-Ray disc or other application-based physical storage medium.

The application 106 may be embedded in the physical storage medium 104 associated with the first electronic device 102. The application 106 may comprise suitable logic, code, or a set of instructions executable by the first electronic device 102. The set of instructions of the application 106 may cause the first electronic device 102 to establish pairing with a unique user account in the server 114. The set of instructions of the application 106 may cause the first electronic device 102 to communicate user viewing information associated with a content item played through the physical storage medium 104 to the server 114. The set of instructions of the application 106 may cause the first electronic device 102 to perform various operations as described in FIG. 1.

The display device 108 associated with the first electronic device 102 may comprise suitable logic, circuitry, interfaces, and/or code that may be configured to display digital content via the application interface 110 rendered on the display device 108. When the first electronic device 102 plays the digital content pre-stored in the physical storage medium 104 or new content received from the server 114 through the physical storage medium 104, the digital content may be displayed via the application interface 110. The application interface 110 may correspond to the application embedded in the physical storage medium 104. Examples of the display device 108 may include, but are not limited to, a display screen, a television (TV), a laptop, a tablet computer, and/or a smartphone.

The application interface 110 may correspond to a graphical interface of the application 106 accessed from the first electronic device 102. The application interface 110 rendered on a display screen, such as the display device 108, may enable interaction with the user 120. The application interface 110 may be configured to display digital content to the user 120 on the display device 108 when the physical storage medium 104 may be operated by the first electronic device 102.

The second electronic device 112 may comprise suitable logic, circuitry, interfaces, and/or code that may be configured to access online content, such as digital content streamed from the server 114. Examples of the second electronic device 112 may include, but are not limited to, a personal computer, a laptop computer, a handheld computer, a smartphone, a gaming console, a digital camcorder, and/or an IPTV.

The server 114 may comprise suitable logic, circuitry, interfaces, and/or code that may be configured to control playback of digital content. The server 114 may be further configured to store a set of instructions, logic, a set of routines, protocols, and/or tools associated with the API 116 that specifies interaction of software components. The server 114 may further store a database that may include information of a plurality of unique user accounts for multiple users, such as the user 120. Examples of the server 114 may include, but are not limited to, a web server, a database server, a cluster-computing device, a cloud-based server, a file server, an application server, and/or their combination.

The API 116 may comprise a set of instructions, logic, a set of routines, protocols, and/or tools that specifies interaction of software components. The API 116 may be programmed to carry out one or more specific functions, such as pairing interactions, update of watch or viewing history of user 120, and other server-client interactions, such as interactions between the first electronic device 102 and the server 114. The server 114 may be associated with one or more APIs, such as the API 116. The API 116 may interact with an operating system of the server 114, a website, and/or remotely interact with the application 106.

The communication network 118 may include a medium through which the server 114, one or more client devices, such as the first electronic device 102, may communicate with each other. Examples of the communication network 118 may include, but are not limited to, the Internet, a cloud network, a Long Term Evolution (LTE) network, Global System for Mobile Communications (GSM), a Wireless Fidelity (Wi-Fi) network, a wireless personal area network (WPAN), a Wireless Local Area Network (WLAN), a Local Area Network (LAN), a wireless wide area network (WWAN), a telephone line (POTS), and/or a Metropolitan Area Network (MAN). Various devices in the network environment 100 may be operable to connect to the communication network 118, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), Hypertext Transfer Protocol Secure (HTTPS), File Transfer Protocol (FTP), Zigbee, Enhanced Data GSM Environment (EDGE), infrared (IR), IEEE 802.11, 802.16, cellular communication protocols, and/or Bluetooth (BT) communication protocols.

In operation, the first electronic device 102 may be configured to operate and/or control operation of the physical storage medium 104. The first electronic device 102 may be configured to render the application interface 110 on the display device 108. The displayed application interface 110 may include one or more menu items and/or radio buttons to enable playing of content items pre-stored in the physical storage medium 104, configuration settings, and/or an UI element to pair with the server 114.

In accordance with an embodiment, the first electronic device 102 may be configured to receive an input, via the application interface 110, to initiate pairing with a unique user account in the server 114. The user 120 may provide the input to select the UI element via the application interface 110 to initiate pairing with the server 114. The first electronic device 102 may be configured to communicate a pairing request to the server 114 based on the received input, by use of the application 106.

In accordance with an embodiment, the server 114 may be configured to receive the pairing request from the first electronic device 102. The interaction between the first electronic device 102 and the server 114 may be facilitated by the API 116 of the server 114. The API 116 of the server 114 may generate a unique paring code to be communicated to the first electronic device 102 to enable the pairing with the first electronic device 102. In accordance with an embodiment, the server 114 may be configured to communicate the generated pairing code to the first electronic device 102. The pairing code may correspond to, for example, a unique numeric or alphanumeric code, a pairing instruction message, a link for pairing, and/or a two-dimensional barcode, such as a QR code.

In accordance with an embodiment, the first electronic device 102 may be configured to receive the pairing code from the server 114. In accordance with an embodiment, the first electronic device 102 may be configured to display the received unique paring code, via the application interface 110, on the display device 108. The received unique paring code may be routed through and/or made accessible to the application 106 embedded in the physical storage medium 104 currently played by the first electronic device 102, to enable display of the unique paring code via the application interface 110.

In accordance with an embodiment, the first electronic device 102 may be configured to perform pairing of the first electronic device 102 associated with the physical storage medium with the unique user account in the server 114. The pairing of the first electronic device 102 may be performed by use of the application 106 embedded in the physical storage medium 104. In other words, the application 106 may cause the first electronic device 102 to pair with the unique user account in the server 114. The pairing of the first electronic device 102 may be performed based on the received pairing code. For instance, the user 120 may use the pairing code when received as the unique numeric or alphanumeric code, via the application interface 110.

In accordance with an embodiment, the first electronic device 102 may be configured to receive an input to enable selection of the one or more menu items to enable playing of a content item pre-stored in the physical storage medium 104. The selected content item may be played through the physical storage medium 104, such as the Blu-ray disc, by the first electronic device 102. The content item, such as a video, may be rendered via the application interface 110 of the application 106.

In accordance with an embodiment, the first electronic device 102 may be configured to generate user viewing information associated with one or more content items played through the physical storage medium 104 at predetermined time intervals. The user viewing information may be generated utilizing the application 106. In other words, the application 106 may cause the first electronic device 102 to generate user viewing information associated with one or more content items played through the physical storage medium 104.

In accordance with an embodiment, the user viewing information may include, for example, an identifier (ID) of the first electronic device 102, an ID of the content item, an ID of the physical storage medium 104, a timestamp, a viewing session value, and/or view state information. The timestamp may correspond to a current time as per the location of the first electronic device 102 when the user viewing information is communicated to the server 114. The viewing session value may indicate whether the current viewing session is a new viewing session or a continuation of previous viewing session associated with the viewed content item. The number of times the user 120 views the one or more content items played through the physical storage medium 104, a counter associated with the viewing session value may be updated. The view state information may include a current timing information associated with the content item currently played through the physical storage medium 104. For instance, the user 120 may view the content item, such as a movie, at a playback time of 1 Hour, 5 minutes "01:05:00". This current playback time may be communicated to the server 114. The view state information may further correspond to user-preferences, such as audio language, audio commentary, subtitle language, volume level, and/or subtitle status, at the time of viewing the content item.

In accordance with an embodiment, the user viewing information may further include one or more viewing progress values based on input received from user. The viewing progress values may be related to play and control modes, for example, start, pause, fast forward, rewind, and/or stop events to track the viewing progress of the content item currently played through the physical storage medium 104.

In accordance with an embodiment, the first electronic device 102 may be configured to communicate user viewing information, associated with the content item currently played through the physical storage medium to the server 114. The generated user viewing information may be periodically or aperiodically communicated to the server 114 to update the user viewing information for the unique user account at the server 114.

In accordance with an embodiment, the server 114, by use of the API 116, may be configured to receive the user viewing information from the first electronic device 102. The server 114 may be configured to update a watch or viewing history for the unique user account associated with the user 120 at the server 114 based on the received user viewing information.

In certain scenarios, the user 120 may need to move to another place where the physical storage medium 104 may not be available. However, the user 120 may still desire to view the content item previously viewed through the physical storage medium 104 played by the first electronic device 102. The user 120 may login to the unique user account from another device, such as the second electronic device 112. In accordance with an embodiment, the playback of the content item may be resumed on login to the unique user account from the second electronic device 112, from a last view state of the content item played through the physical storage medium 104 by the first electronic device 102. The server 114 may be configured to stream the content item from the last view state to the second electronic device 112 on login to the unique user account from the second electronic device 112. Thus, a seamless viewing experience may be provided to the user 120.

In accordance with an embodiment, the server 114, by use of the API 116, may be configured to communicate a new content item to the first electronic device 102. The new content item may correspond to content item not previously stored in the physical storage medium 104 played by the first electronic device 102. The first electronic device 102 may be configured to play the new content item received from the server 114 through the physical storage medium 104. The new content item may be played through the physical storage medium 104 by the first electronic device 102. In other words, the new content item may be played by dynamically updating the application 106 embedded in the physical storage medium 104.

In accordance with an embodiment, the new content item received from the server 114 may include a dynamic advertising, a promotional content, menu update information, and/or one or more other content items, such as a video, which may be different from content items pre-stored in the physical storage medium 104, such as the Blu-ray disc. The new content item, such as the dynamic advertising or the menu update information, may be inserted, in the application interface 110. The new content item may be displayed, for example, utilizing one or more graphical placeholders on the application interface 110. For example, the physical storage medium 104 may be a Blu-ray disc. In such a case, the new content item may be played through the Blu-ray disc by the first electronic device 102. In other words, the application 106 embedded in the Blu-ray disc may be updated to enable viewing of the new content item, via the application interface 110.

In accordance with an embodiment, the first electronic device 102 may be configured to dynamically change a menu navigation system of the application 106 embedded in the physical storage medium 104. The change may occur based on instructions and/or the update received from the server 114. The application 106 embedded in the physical storage medium 104 may be updated or otherwise configured to cause the change in the menu navigation system. In accordance with an embodiment, the server 114, by use of the API 116, may be configured to determine a usage pattern associated with the physical storage medium 104 based on the received user viewing information from the first electronic device 102.

Figure 2:
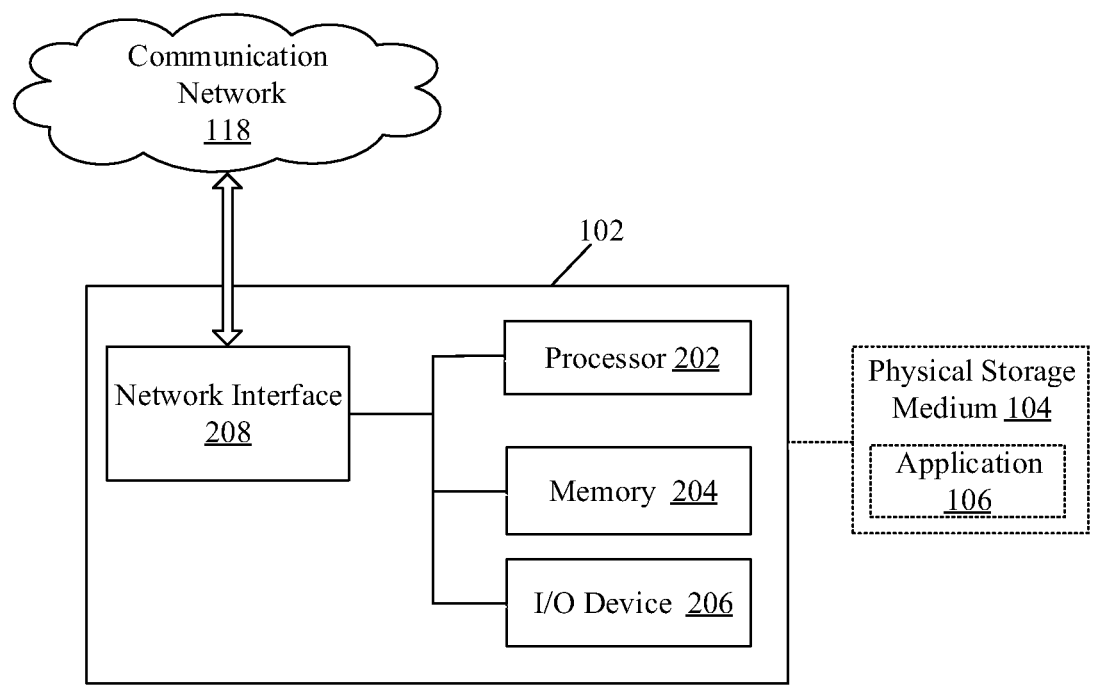
FIG. 2 is a block diagram that illustrates an exemplary electronic device to control playback of digital content, in accordance with an embodiment of the disclosure.

FIG. 2 is a detailed block diagram that illustrates an exemplary electronic device to control playback of digital content, in accordance with an embodiment of the disclosure. FIG. 2 is explained in conjunction with elements from FIG. 1. With reference to FIG. 2, the first electronic device 102 may include a processor 202, a memory 204, one or more input/output (I/O) devices, such as an I/O device 206, and a network interface 208.

The physical storage medium 104 that include the application 106 may be associated with the first electronic device 102. The processor 202 may be communicatively coupled to the memory 204, the I/O device 206, and the network interface 208. The network interface 208 may communicate with the server 114, via the communication network 118, under the control of the processor 202.

The processor 202 may comprise suitable logic, circuitry, interfaces, and/or code that may be configured to execute a set of instructions stored in the memory 204. The processor 202 may be configured to operate the physical storage medium 104 when the physical storage medium 104 is connected with or inserted in the first electronic device 102. Examples of the processor 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may comprise suitable logic, circuitry, and/or interfaces that may be configured to store a machine code and/or a set of instructions executable by the processor 202. The memory 204 may be configured to buffer the streaming data received from the server 114. The streaming data may then be pushed or otherwise communicated through the physical storage medium 104 by use of the application 106, so that the received streaming data may be viewed by the application interface 110. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may comprise suitable logic, circuitry, interfaces, and/or code that may be configured to receive an input from the one or more users, such as the user 120. The I/O device 206 may be further configured to provide an output to the one or more users. The I/O device 206 may comprise various input and output devices that may be operable to communicate with the processor 202. Examples of the input devices may include, but are not limited to, a touch screen, physical or virtual input buttons, an infrared sensor, a joystick, a microphone, a motion sensor, a light sensor, one or more sensors, such as a geospatial location detection sensor, and/or a docking station. Examples of the output devices may include, but are not limited to, an-inbuilt display screen, a touch screen display, and/or a speaker.

The network interface 208 may comprise suitable logic, circuitry, interfaces, and/or code that may be configured to connect and communicate with an external display, such as the display device 108, via the communication network 118. The network interface 208 may be operable to implement various communication technologies to support wired or wireless communication with the communication network 118. The network interface 208 may include, but is not limited to, an antenna, a frequency modulation (FM) network interface, a radio frequency (RF) network interface, one or more amplifiers, a tuner, one or more oscillators, a digital signal processor, a coder-decoder (CODEC) chipset, a subscriber identity module (SIM) card, and/or a local buffer. The network interface 208 may communicate via wireless communication with networks, such as the Internet, an Intranet and/or a wireless network, such as a cellular telephone network, the LAN and/or MAN. The wireless communication may use any of a plurality of communication standards, protocols and technologies, such as LTE, GSM, EDGE, wideband code division multiple access (W-CDMA), code division multiple access (CDMA), time division multiple access (TDMA), Bluetooth, Wi-Fi, IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

In operation, the processor 202 may be configured to operate the physical storage medium 104 when the physical storage medium 104 is connected with or inserted into the first electronic device 102. The physical storage medium 104 may be a removable storage medium, such as a Blu-ray disc. The processor 202 may be configured to render the application interface 110 on the display device 108. The displayed application interface 110 may include one or more menu items to enable playing of content items pre-stored in the physical storage medium 104, configuration settings, and/or an UI element to pair with the server 114. An example of the application interface 110 is shown in FIG. 4B.

In accordance with an embodiment, the processor 202 may be configured to receive an input, via the application interface 110, to initiate pairing with a unique user account in the server 114. The user 120 may provide an input to select the UI element via the application interface 110 to initiate pairing with the server 114. The processor 202 may be configured to communicate a pairing request to the server 114 via the network interface 208.

In accordance with an embodiment, the processor 202 may be configured to receive the pairing code from the server 114. In accordance with an embodiment, the processor 202 may be configured to display the received unique paring code, via the application interface 110, on the display device 108. The received unique paring code may be routed through and/or made accessible to the application 106 embedded in the physical storage medium 104 currently played by the processor 202, to enable display of the unique paring code via the application interface 110. The pairing code may correspond, for example, to a unique numeric or alphanumeric code, a pairing instruction message, a link for pairing, and/or a two-dimensional barcode, such as a QR code.

In accordance with an embodiment, the processor 202 may be configured to pair the first electronic device 102 associated with the physical storage medium 104 with the unique user account in the server 114. The pairing of the first electronic device 102 may be performed by use of the application 106 embedded in the physical storage medium 104. In other words, the application 106 may cause the processor 202 to pair the first electronic device 102 with the unique user account in the server 114. The pairing of the first electronic device 102 may be performed based on the received pairing code. For instance, the user 120 may use the pairing code when received as the unique numeric or alphanumeric code, via the application interface 110. The first electronic device 102 may be configured to receive a response related to a pairing status from the server 114. The response may correspond to a pairing success message upon successful pairing between the first electronic device 102 associated with the physical storage medium 104 with the unique user account in the server 114. The pairing process have been described in further details in FIGS. 4C, 4D, and 4E.

As a device, such as the first electronic device 102, is paired instead of the physical storage medium 104 itself, the user 120 may use different physical storage mediums for the same device, such as the first electronic device 102. Once the first electronic device 102 is paired, by use of the physical storage medium 104, when another physical storage medium is inserted in (or communicatively coupled to) the first electronic device 102, the other physical storage medium may also be paired automatically and instantaneously upon playback by the first electronic device 102. This ability of persistent pairing or recurring pairing may eliminate the need to pair each physical storage medium, such as the Blu-ray disc, separately to create the unique user account (a content library) for each user.

In accordance with an embodiment, the processor 202 may be configured to receive an input to enable selection of the one or more menu items to enable playing of a content item pre-stored in the physical storage medium 104. The selected content item may be played through the physical storage medium 104, such as the Blu-ray disc, by the first electronic device 102. The content item, such as a video, may be rendered via the application interface 110 of the application 106.

In accordance with an embodiment, the application 106 may cause the processor 202 to generate user viewing information associated with one or more content items played through the physical storage medium 104 at predetermined time intervals. In accordance with an embodiment, the user viewing information may include an identifier (ID) of the first electronic device 102, an ID of the content item, and/or an ID of the physical storage medium 104, such as a disc ID. The user viewing information may also include a timestamp, such as current time as per the location of the first electronic device 102, a viewing session value, view state information, and/or current timing information associated with the content item currently played through the physical storage medium 104. In accordance with an embodiment, the user viewing information associated with content item may further include other view state information, such as audio language, audio commentary, subtitle language, volume level, and/or subtitle status. As an illustrative example, when the user 120 may be viewing the content item, the subtitle language may be "American English", the subtitle may be "ON" or "OFF", and timing of the view progress of content item may be 10 minutes and 54 seconds, such as "00:10:54". Such view state information may be communicated to the server 114

In accordance with an embodiment, the user viewing information may further include one or more viewing progress values based on input received from user. The viewing progress values may be related to start, pause, fast forward, rewind, and/or stop events to track the viewing progress of the content item currently played through the physical storage medium 104. For example, when the user 120 provides an input, such as press of start button or pause button, it may indicate the current progress of the content item viewed via the application interface 110.

In accordance with an embodiment, the processor 202 may be configured to communicate user viewing information to the server 114 by use of the network interface 208. The user viewing information may be associated with the content item currently played through the physical storage medium 104. The generated user viewing information may be periodically or aperiodically communicated to the server 114 to update the user viewing information for the unique user account at the server 114.

At a certain time instance, the user 120 may wish to discontinue viewing the content item, played through the physical storage medium 104, such as a Blu-Ray disc. At a later time instance, the user 120 may wish to resume playback of the digital content on another electronic device, such as the second electronic device 112. The user 120 may then login to the unique user account from the other electronic device, such as the second electronic device 112. In accordance with an embodiment, the playback of the content item may be resumed on login to the unique user account from the second electronic device 112, from a last view state, such as from 10 minutes and 54 seconds, of the content item played through the physical storage medium 104 by the first electronic device 102. Further, at a subsequent time instance, the user 120 may switch to the first electronic device 102 to view the content item, playing through the physical storage medium 104, such as a Blu-Ray disc. The application 106 embedded in the physical storage medium 104 may, for example, call the API 116 of the server 114 to receive the watch history of the user 120 associated with the unique user account. Based on the received watch history, the application 106 may cause the processor 202 to play the content item (offline) through the physical storage medium 104, such as a Blu-Ray disc, from the last view state at the second electronic device 112. In other words, the user 120 may begin viewing the content item through the physical storage medium 104 from a same view state where the user 120 left at the second electronic device 112. Thus, a seamless viewing experience may be provided to the user 120 across multiple devices, and viewing platforms.

In accordance with an embodiment, a new content item previously not stored in the physical storage medium 104, may be received from the server 114. The processor 202 may be configured to play the new content item received from the server 114 through the physical storage medium 104. The new content item may be played through the physical storage medium 104 by the first electronic device 102. In other words, the new content item may be played by dynamically updating the application 106 embedded in the physical storage medium 104.

In accordance with an embodiment, the new content item received from the server 114 may include a dynamic advertising, a promotional content, menu update information, and/or one or more other content items, such as a video, different from content items pre-stored in the physical storage medium 104, such as the Blu-ray disc. The new content item, such as the dynamic advertising or the menu update information, may be inserted, in the application interface 110. The new content item may be displayed via one or more graphical placeholders on the application interface 110. For example, the physical storage medium 104 may be a Blu-ray disc. In such a case, the new content item may be played through the Blu-ray disc by the first electronic device 102. In other words, the application 106 embedded in the Blu-ray disc may be updated or otherwise configured to enable viewing of the new content item, via the application interface 110.

In accordance with an embodiment, the processor 202 may be configured to dynamically change or modify a menu navigation system of the application 106 embedded in the physical storage medium 104. The change or modification may occur based on instructions and/or the update received from the server 114. The application 106 embedded in the physical storage medium 104 may be updated or otherwise configured to cause the change or modification in the menu navigation system. For example, drop-down menu items of the application 106 may be updated to include new elements.

Figure 3:
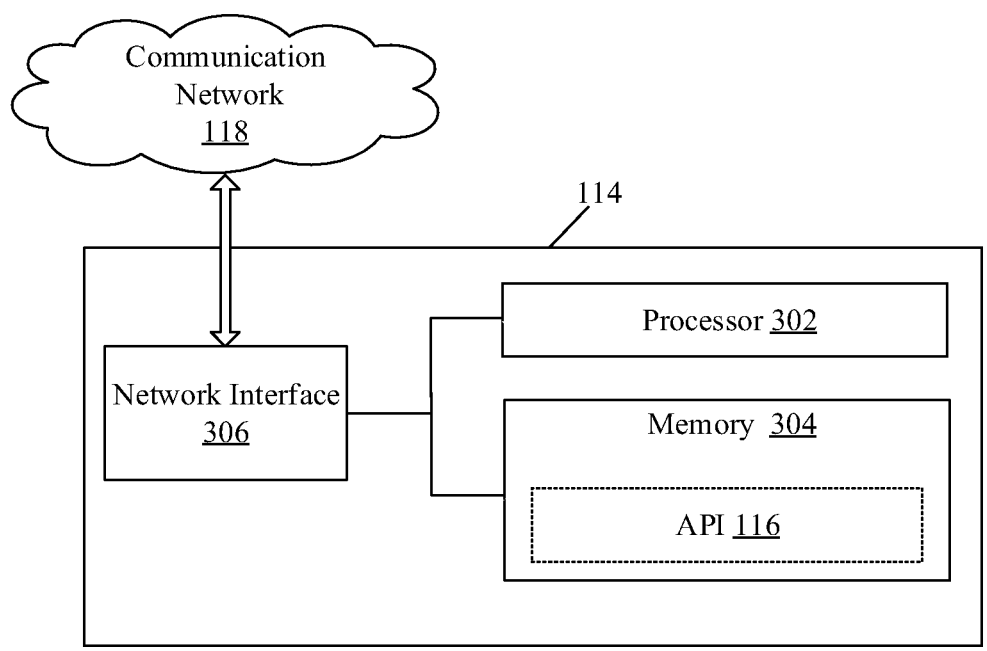
FIG. 3 is a block diagram that illustrates an exemplary server to control playback of digital content, in accordance with an embodiment of the disclosure.

FIG. 3 is a block diagram that illustrates an exemplary server to control playback of digital content, in accordance with an embodiment of the disclosure. FIG. 3 is explained in conjunction with elements from FIG. 1 and FIG. 2. With reference to FIG. 3, the server 114 may comprise a processor 302, a memory 304, and a network interface 306. In accordance with an embodiment, the processor 302 may be communicatively coupled to the memory 304 and the network interface 306. The network interface 306 may be configured to communicate with the first electronic device 102, via the communication network 118, under the control of the processor 302.

The processor 302 may comprise suitable logic, circuitry, interfaces, and/or code that may be configured to execute a set of instructions stored in the memory 304. In accordance with an embodiment, the processor 302 may utilize, for example, one or more APIs, such as the API 116, during interaction with the first electronic device 102. Examples of implementation of the processor 302 may be similar to the processor 202 (FIG. 2).

The memory 304 may comprise suitable logic, circuitry, and/or interfaces that may be configured to store a machine code and/or a set of instructions executable by the processor 302. The memory 304 may be further configured to store a set of instructions, logic, a set of routines, protocols, and/or tools of the API 116 that specifies interaction of software components. The memory 304 may further store a database that may include information of a plurality of unique user accounts for multiple users, such as the user 120. For example, the watch history of the user 120 may be periodically or aperiodically updated and stored in the database based on the user viewing information received from the first electronic device 102. The memory 304 may further store a plurality of content items to be streamed to paired electronic devices, such as the first electronic device 102. The memory 304 may correspond to a cloud storage. Other examples of implementation of the memory 304 may be similar to the memory 204 (FIG. 2).

The network interface 306 may comprise suitable logic, circuitry, interfaces, and/or code that may be configured to transmit the digital content to the display device 108, via the communication network 118. The network interface 306 may implement known technologies to support wired or wireless communication with the communication network 118. Examples of implementation of the network interface 306 may be similar to the network interface 208 (FIG. 2).

In operation, the processor 302 may be configured to receive the pairing request from the first electronic device 102, via the network interface 306. The API 116 may facilitate interaction between the first electronic device 102 and the server 114. The API 116 of the server 114 may generate a unique paring code to be communicated to the first electronic device 102 to enable the pairing with the first electronic device 102. In accordance with an embodiment, the server 114 may be configured to communicate a pairing code to the first electronic device 102. The pairing code may correspond to a unique numeric or alphanumeric code, a pairing instruction message, a link for pairing, and/or a two-dimensional barcode, such as a QR code.

In accordance with an embodiment, the processor 302, via the API 116, may be configured to receive the user viewing information from the first electronic device 102, via the network interface 306. The server 114 may be configured to update a watch history for the unique user account associated with the user 120 at the server 114 based on the received user viewing information. The watch history may be updated in the database associated with the unique user account stored in the memory 304. Similarly, watch history for other users may be updated in the memory 304.

In accordance with an embodiment, the user 120 may login to the unique user account from the second electronic device 112. The processor 302 may then stream a content item to the second electronic device 112, via the network interface 306. The content item may be streamed such that playback may be resumed on the second electronic device 112 from the last view state of the content item played through the physical storage medium 104 by the first electronic device 102.

In accordance with an embodiment, the processor 302 may be configured to receive a request to link a social network account of the user 120 to the unique user account of the user 120 in the server 114. Such linking may enable posting of media content viewed through the physical storage medium 104, directly to the linked social network account of the user 120. For example, the user 120 may view a high-definition or 4K content-based movie through the physical storage medium 104, such as the Blu-ray disc. The user 120 may like certain scenes in the movie viewed via the application interface 110 of the application 106, which is embedded in the physical storage medium 104, such as the Blu-ray disc. Based on a user input, the application 106 may cause the first electronic device 102 to extract one or more images corresponding to the viewed scene from the movie video, and post to the social network account of the user 120. The post may be based on the API 116 interaction with the social network account.

In accordance with an embodiment, the processor 302, by use of the API 116, may be configured to communicate a new content item to the first electronic device 102, via the network interface 306. The new content item may correspond to content item not previously stored in the physical storage medium 104 played by the first electronic device 102. The application 106 embedded in the physical storage medium 104 of the first electronic device 102, may be updated. The update may enable playback of the new content item through the physical storage medium 104 of the first electronic device 102.

In accordance with an embodiment, the processor 302, by use of the API 116, may be configured to determine a usage pattern associated with the physical storage medium 104 based on the received user viewing information from the first electronic device 102. For instance, the physical storage medium 104 may be a Blu-ray disc. In such an instance, the processor 302, by use of the API 116, may be configured to track anonymous activity at the disc level to determine the usage patterns. Various parameters, such as an event of disc insertion or which components are played through the Blu-ray disc may be tracked. Further, number of views of a content item using the first electronic device 102 or other device and/or average stop points associated with viewing of content items through the disc may also be tracked. In accordance with an embodiment, audio and subtitle selections, custom feature tracking, such as bonus, galleries, games, etc., advertisement impressions via the application interface 110, user-provided ratings, such as number of likes or stars, for a content item or various components of the application 106 may also be tracked. The determined usage pattern may enhance the usability of the physical storage medium 104, such as the Blu-ray disc, itself, and provide valuable information, to a service provider, to enhance user experience.

Figure 4A:
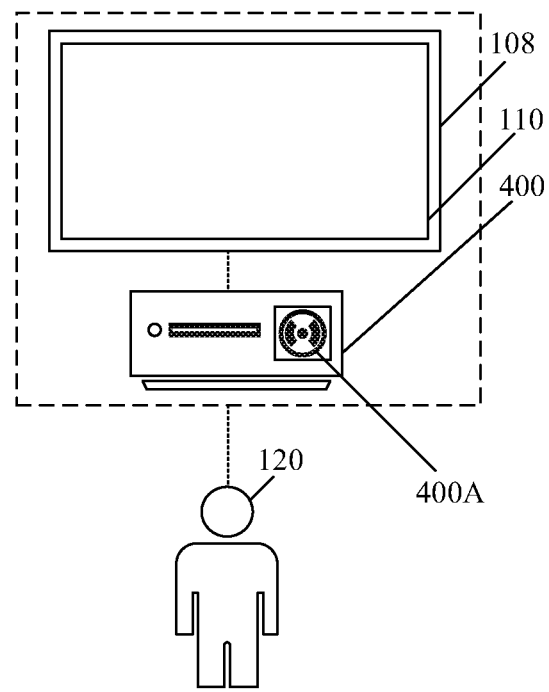
FIGS. 4A, 4B, 4C, 4D, 4E, and 4F, collectively, illustrate an exemplary scenario for implementation of the disclosed system and method to control playback of digital content, in accordance with an embodiment of the disclosure.
Figure 4B:
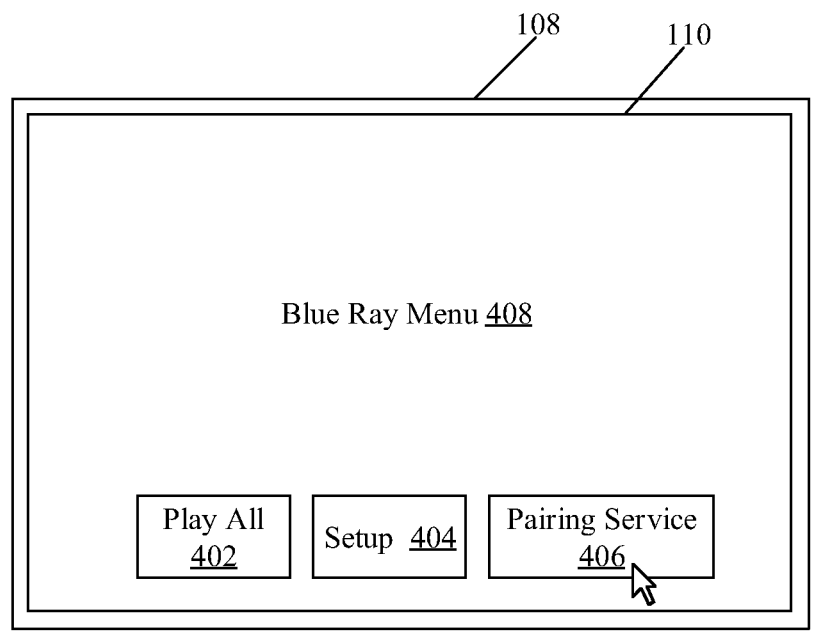

FIGS. 4A to 4F, collectively, illustrate an exemplary scenario for implementation of the disclosed system and method to control playback of digital content, in accordance with an embodiment of the disclosure. FIGS. 4A to 4F are explained in conjunction with elements from FIGS. 1, 2, and 3. With reference to FIG. 4A, there is shown a Blu-Ray disc player 400 and a Blu-Ray disc 400A. The Blu-Ray disc player 400 and the Blu-Ray disc 400A may correspond to the first electronic device 102 and the physical storage medium 104, respectively, of FIG. 1. The application 106 may be embedded in the Blu-Ray disc 400A. The Blu-Ray disc player 400 may be communicatively coupled with a display device, such as the display device 108. The display device 108, which includes the application Interface 110, may be viewed by a viewer, such as the user 120.

With reference to FIG. 4B, there is shown the application interface 110, which is rendered on the display device 108. The application interface 110 may display a Blu-Ray menu 408 that may include various selectable options, such as play all 402, setup 404, and pairing service 406. The application interface 110 may be rendered on the display device 108 after the user 120 inserts the Blu-Ray disc 400A into the Blu-Ray disc player 400, as shown in FIG. 4A.

In accordance with an embodiment, the option play all 406 may be selected via the application interface 110, to enable playing of content items pre-stored in the Blu-Ray disc 400A. The option, setup 404, may be selected via the application Interface 110, for configuration settings related to display of content via the application interface 110. In operation, the user 120 may provide an input to select the UI element of pairing service 406, via the application interface 110. Based on the user input, the Blu-Ray disc player 400 may initiate the pairing process. The pairing process is described, for example, in FIG. 4C.

Figure 4C:
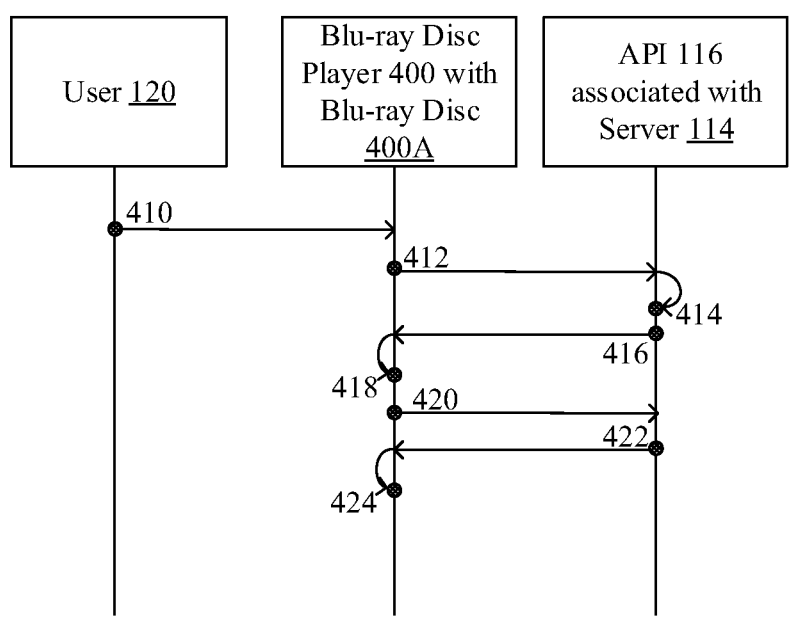

With reference to FIG. 4C, there is shown a flowchart that illustrates a method to initiate pairing between the Blu-Ray disc player 400 and a server, such as the server 114, in accordance with an embodiment of the disclosure. The flowchart is described in conjunction with FIG. 4A, FIG. 4B, and FIG. 4C.

At 410, the user 120 may select the UI element of pairing service 406 to send a request for pairing between the Blu-Ray disc player 400 associated with the Blu-Ray disc 400A with the unique user account in the server 114. At 412, the application 106 in the Blu-Ray disc 400A may cause the Blu-Ray disc player 400 to send the request for pairing to the server 114. The request may be sent based on an interaction with the API 116 associated with the server 114.

At 414, a unique paring code, such as a unique numeric or alphanumeric code, a pairing instruction message, a link for pairing and/or a QR code may be generated by the API 116. At 416, the generated unique paring code may be communicated to the Blu-Ray disc player 400 and provided to the application 106 of the Blu-Ray disc 400A.

At 418, through the Blu-Ray disc 400A, the unique paring code may be displayed to the user 120 for immediate pairing. An example is shown in FIG. 4E. At 420, the application 106 of the Blu-Ray disc 400A may make a call to the API 116 of the server 114 for pairing status for the ID of the Blu-Ray disc player 400.

At 422, the server 114, via the API 116, may communicate the pairing status to the Blu-Ray disc player 400. At 424, a pairing status message may be displayed to the user 120 via the application interface 110. For instance, an error message may be displayed to the user 120 in case of an unsuccessful response from the API 116. The application 106 embedded in the Blu-Ray disc 400A corresponding to the physical storage medium 104 may be updated upon unsuccessful response from API 116 associated with the server 114 to display the error message. In case of a successful pairing, a pairing success message may be displayed to the user 120, via the application interface 110. The pairing status or linked status may be saved locally, such as a cookie, upon successful response from API 116 of the server 114. The pairing with the new unique user account in the server 114 may be established.

Figure 4D:
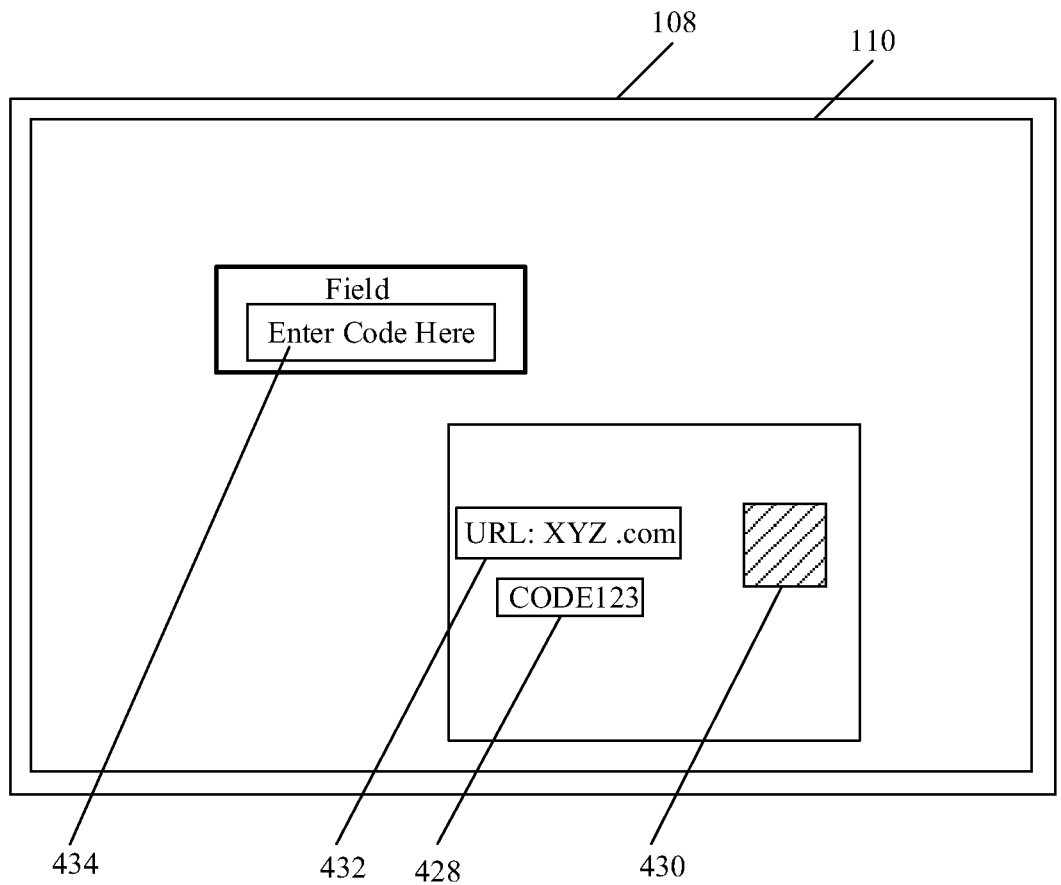
Figure 4E:
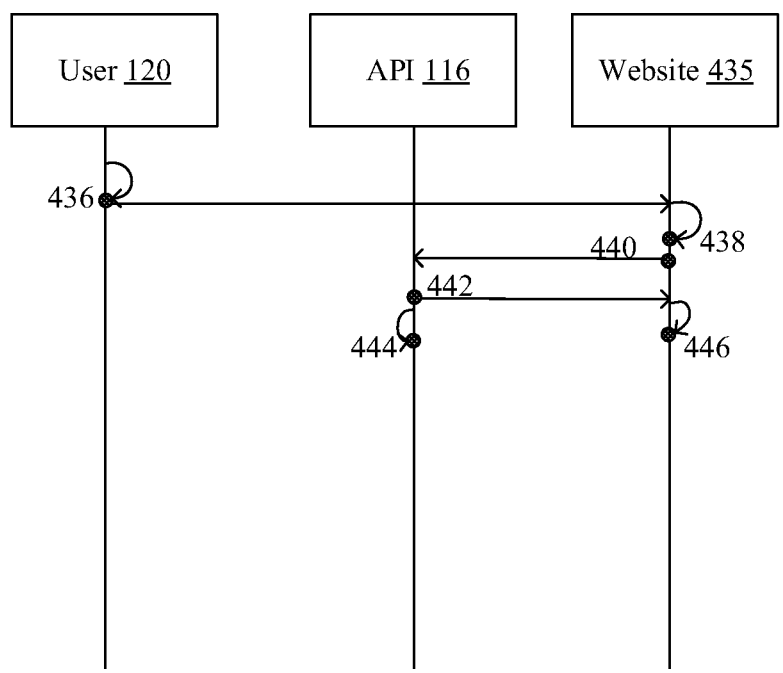

With reference to FIG. 4D, there is shown the application interface 110 in the display device 108 to depict an exemplary view of the unique pairing code received from the server 114. The application interface 110 may display various options, such as an alphanumeric code 428, a QR Code 430, a uniform resource locator (URL) 432 associated with the server 114 to enable pairing, and a user input field 434 within the application interface 110 to allow input of the alphanumeric code 428 to the user input field 434.

In operation, the application interface 110 may display the alphanumeric code 428 and pairing instruction message(s) generated by the server 114. For pairing, the application interface 110 may display the URL 432 and the QR code 430 to the user 120 (not shown) on the display device 108, through the Blu-Ray disc 400A. In accordance with an embodiment, the user 120 may input the displayed alphanumeric code 428 in user input field 434 for the pairing. Alternatively, the user 120 may use the URL 432 to continue pairing.

With reference to FIG. 4E, there is shown a flowchart that illustrates a method for completion of pairing between a first electronic device, such as the Blu-Ray disc player 400, and a server, such as the server 114, from the server side, in accordance with an embodiment of the disclosure. The flowchart is described in conjunction with FIG. 4A, FIG. 4B, FIG. 4C, and FIG. 4D.

At 436, the user 120 may be logged into the unique user account in the server 114, via the Blu-Ray disc player 400 or the second electronic device 112, by use of the URL 432 and the alphanumeric code 428. Alternatively, the user 120 may scan the QR code 430 to auto-fill required embedded information for pairing in the URL 432.

At 438, the website 435 that corresponds to the URL 432, may confirm that the user 120 is logged in to the unique user account. At 440, the website 435 may check the validity of the alphanumeric code 428 entered by the user 120. The website 435 may query the API 116 associated with the server 114 to check the validity for the alphanumeric code 428 entered by the user 120.

At 442, the server 114, by use of the API 116, may return pairing status to the website 435. In an instance, when the response is unsuccessful, the pairing status may include an error message. In an instance, when the response is successful, the website 435 may confirm linked status to the user 120.

At 444, based on the confirmation of the linked status to the user 120, the API 116 may be updated with the established pairing between the Blu-Ray disc player 400 with the unique user account in the server 114. At 446, the website 435 may display response accordingly based on interaction with the API 116, such as display of error message upon expiry or invalidity of the pairing code or display of success message upon successful pairing.

Once paired, the application 106 of the Blu-Ray disc 400A may cause the Blu-Ray disc player 400 to communicate user viewing information associated with content item of digital content, currently played through the Blu-Ray disc 400A, to the server 114. The application 106 embedded in the Blu-Ray disc 400A may update the progress of watching the content item with the API 116 associated with the server 114. The server 114 may be configured to update a watch history for the unique user account associated with the user 120 at the server 114 based on the received user viewing information. The API 116 may update viewing information associated with the content item after a pre-specified time duration, such as "every 5 seconds", when the content item currently played is not paused.

At a time instance, the user 120 may wish to discontinue viewing the digital content, displayed through the Blu-Ray disc 400A. At a later time instance, the user 120 may wish to resume playback of the digital content on another electronic device, such as a tablet device (not shown). The tablet device may correspond to the second electronic device 112, as shown in FIG. 1. The user 120 may login to the unique user account, such as the website 435, via the tablet device. Once logged in, the server 114, by use of the API 116, may stream the same content item previously viewed through the Blu-Ray disc 400A based on the watch history of the user 120. The playback of the content item may be resumed on the tablet from the last view state of the content item, such as from 30 minutes, previously played through the Blu-Ray disc 400A.

Figure 4F:
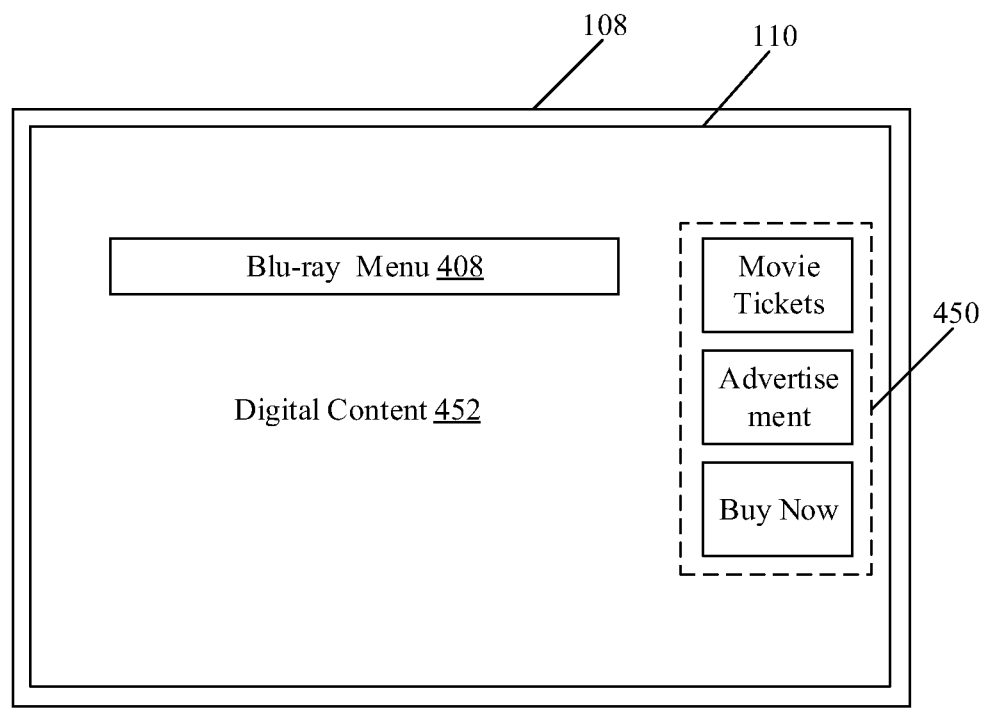

With reference to FIG. 4F, there is shown the application interface 110 in the display device 108. The application interface 110 may display graphical placeholders 450, digital content 452, such as one or more content items, and/or the Blu-Ray menu 408. FIG. 4F is explained in conjunction with elements from FIGS. 4A and 4B.

In operation, the application Interface 110 may be configured to display the digital content 452 to the user 120 on the display device 108 through the Blu-Ray disc 400A. The application 106 may cause the Blu-Ray disc player 400 to further play a new content item, received from the server 114, through the Blu-Ray disc 400A. The application 106 embedded in the Blu-Ray disc 400A may be dynamically updated. The new content item may be received from the server 114. Examples of the new content item may comprise, but are not limited to, one or more of dynamic advertisements, promotional content, menu update information, and/or other content items different from content items pre-stored in the Blu-Ray disc 400A.

Figure 5A:
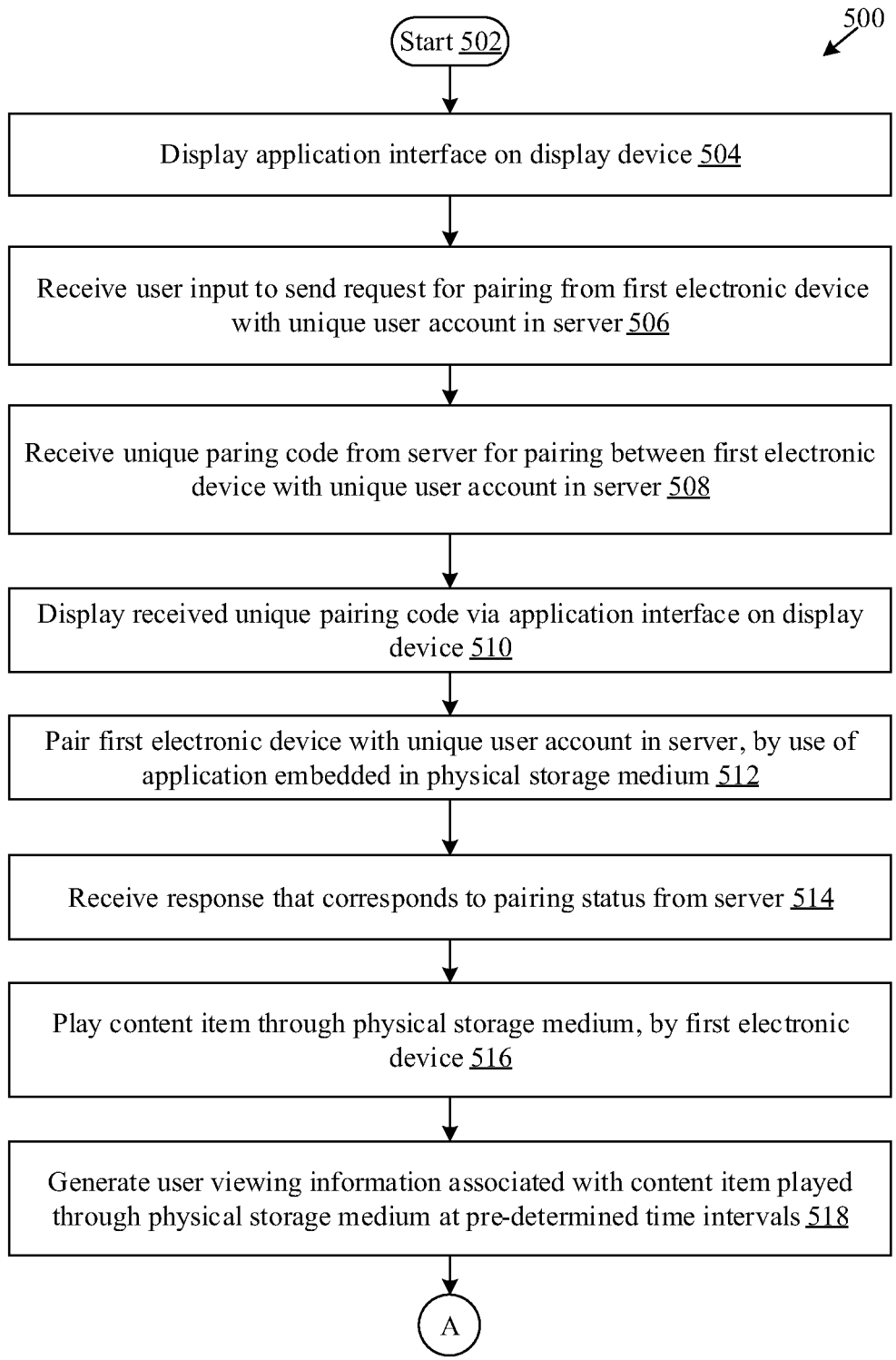
FIGS. 5A and 5B, collectively, depict a first flowchart that illustrates a method to control playback of digital content, in accordance with an embodiment of the disclosure.
Figure 5B:
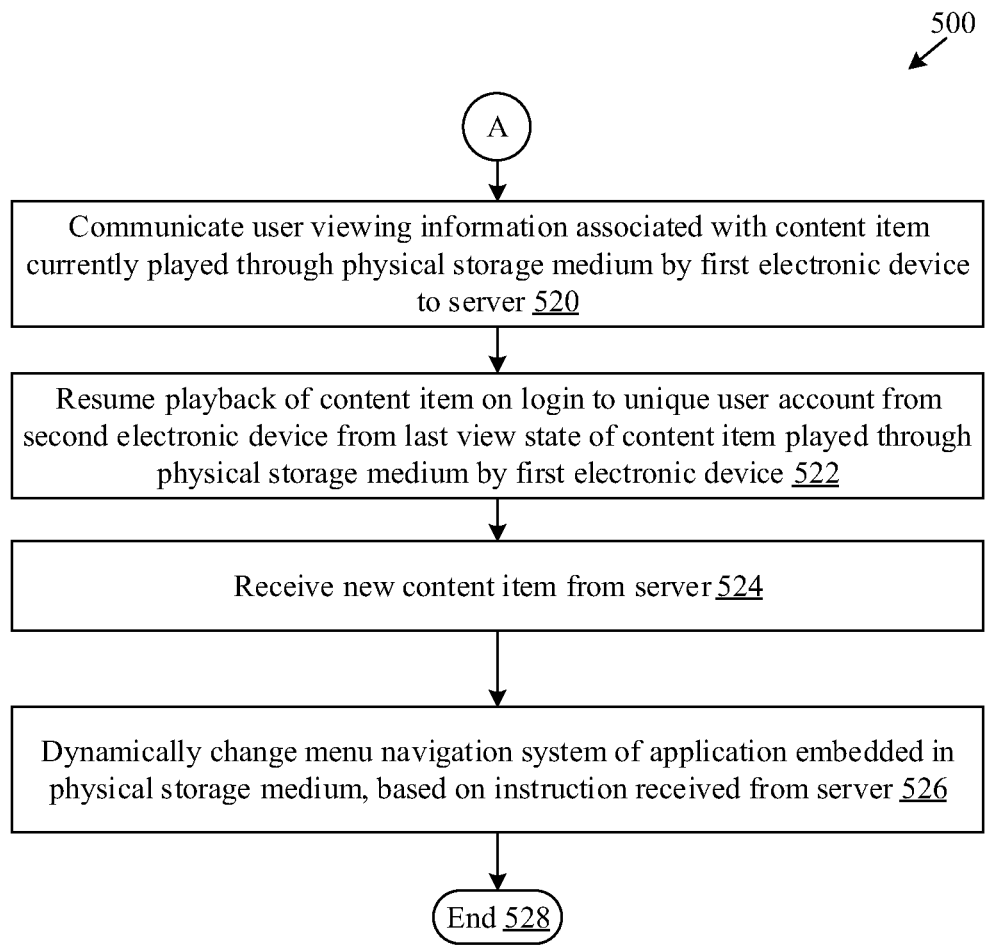

FIGS. 5A and 5B, collectively depict, a first flowchart that illustrates a method to control playback of digital content, in accordance with an embodiment of the disclosure. With reference to FIG. 5, there is shown a flowchart 500. The flowchart 500 is described in conjunction with FIG. 1. The method, implemented at the first electronic device 102, starts at 502 and proceeds to 504.

At 504, the application interface 110 may be displayed on the display device 108. The application 106 embedded in the physical storage medium 104 may cause the first electronic device 102 to render the application interface 110 on the display device 108. At 506, a user input may be received to send a request for pairing from the first electronic device 102 with a unique user account in the server 114.

At 508, a unique paring code may be received from the server 114 for pairing between the first electronic device 102 with the unique user account in the server 114. The application 106 may cause the first electronic device 102 to receive the unique paring code from the server 114. At 510, the received unique pairing code may be displayed via the application interface 110 on the display device 108. The received unique pairing code may be routed through and/or made accessible to the application 106 embedded in the physical storage medium 104, such as the Blu-ray disc 400A.

At 512, the first electronic device 102 may be paired with the unique user account in the server 114, by use of the application 106, embedded in the physical storage medium 104. The pairing may be established based on the displayed unique pairing code. At 514, a response that corresponds to a pairing status may be received from server 114. The response may be received upon successful pairing of the first electronic device 102 with the unique user account in the server 114.

At 516, a content item may be played through the physical storage medium 104, such as the Blu-ray disc 400A, by the first electronic device 102. The played content item may be displayed via the application interface 110 of the application 106. At 518, user viewing information associated with the content item played through the physical storage medium 104 may be generated at pre-determined time intervals.

At 520, user viewing information associated with the content item currently played through the physical storage medium 104 by the first electronic device 102, may be communicated to the server 114. At 522, playback of content item may be resumed on login to the unique user account from the second electronic device 112 from last view state of the content item played through the physical storage medium 104 by the first electronic device 102.

At 524, a new content item may be received from the server 114. At step 526, the received new content item may be played through the physical storage medium 104 by dynamically updating the application 106. At step 526, a menu navigation system, such as the Blu-Ray menu 408, of the application 106 embedded in the physical storage medium 104 may be dynamically changed based on instructions received from the server 114. The control passes to the end step 528.

Figure 6:
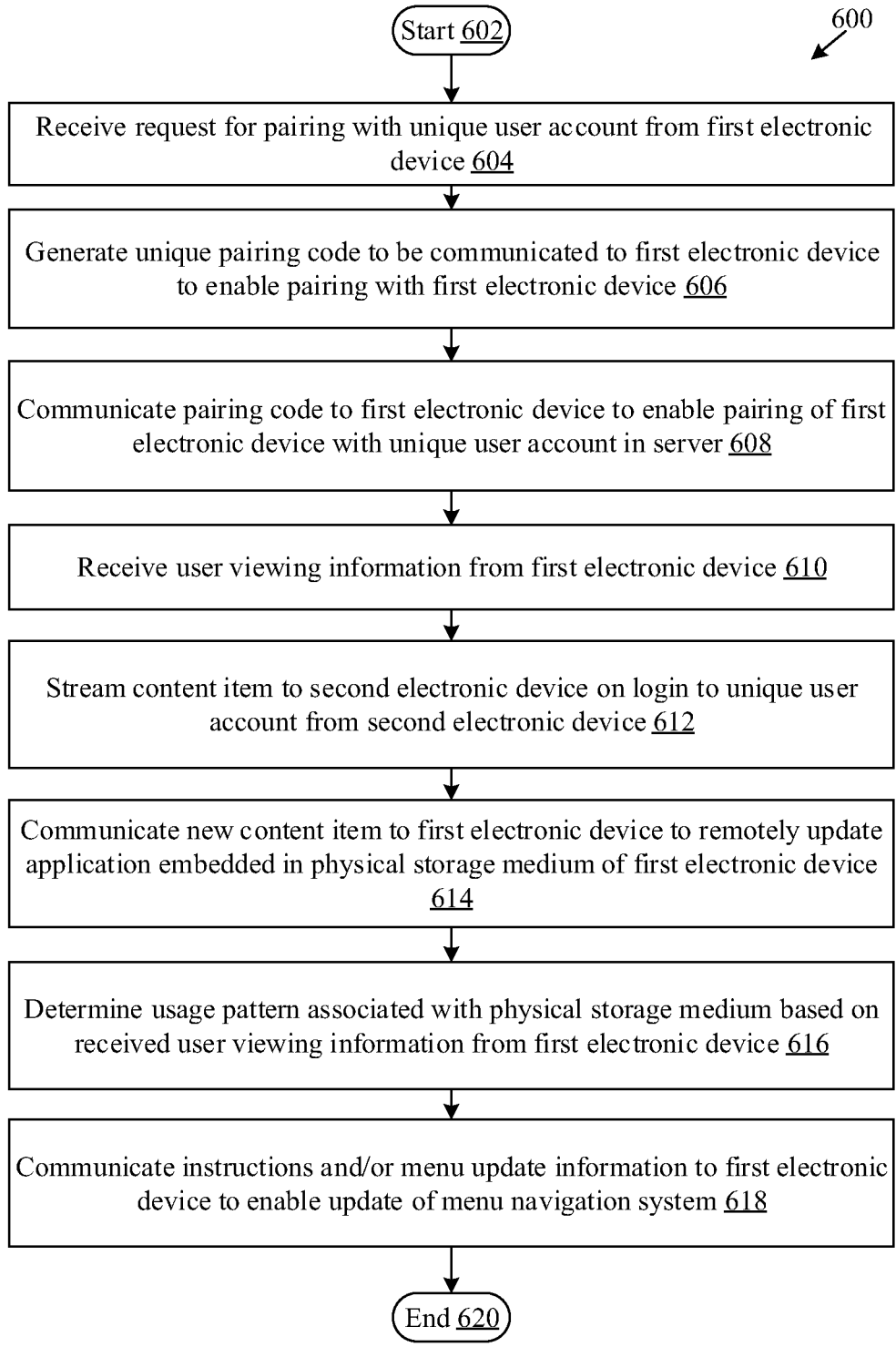
FIG. 6 is a second flowchart that illustrates an exemplary method to control playback of digital content, in accordance with an embodiment of the disclosure.

FIG. 6 is a second flowchart that illustrates an exemplary method to control playback of digital content, in accordance with an embodiment of the disclosure. With reference to FIG. 6, there is shown a flowchart 600. The flowchart 600 is described in conjunction with FIGS. 1, 2, 3, and 4A to 4F. The method, implemented at the server 114, starts at 602 and proceeds to 604.

At 604, a request may be received for pairing with the unique user account from the first electronic device 102 using an interface, such as the API 116, of the server 114. At 606, a unique pairing code may be generated to be communicated to the first electronic device 102 to enable pairing with the first electronic device 102.

At 608, the pairing code may be communicated to the first electronic device 102 to enable pairing of the first electronic device 102 with the unique user account in the server 114. At 610, user viewing information may be received from the first electronic device 102. The user viewing information may be associated with the content item played through the physical storage medium 104 by the first electronic device 102.

At 612, a content item may be streamed to the second electronic device 112 on login to the unique user account from the second electronic device 112. The content item may be streamed such that playback may be resumed on the second electronic device 112 from the last view state of the content item played through the physical storage medium 104 by the first electronic device 102. At 614, a new content item may be communicated to the first electronic device 102 to remotely update the application 106 embedded in the physical storage medium 104 of the first electronic device 102. The update may enable playback of the new content item through the physical storage medium 104 of the first electronic device 102.

At 616, a usage pattern associated with the physical storage medium 104 may be determined based on the received user viewing information from the first electronic device 102. At 618, instructions and/or menu update information may be communicated to the first electronic device 102 to enable update of the menu navigation system, such as the Blu-Ray menu 408, of the application 106 embedded in the physical storage medium 104. The control passes to the end 620.

In accordance with an embodiment of the disclosure, a system to control playback of digital content is disclosed. The system (such as the first electronic device 102 (FIG. 1) may comprise one or more circuits (hereinafter referred to as the processor 202) configured to pair the first electronic device 102 with a unique user account in a server 114, using an application 106 embedded in the physical storage medium 104. User viewing information, associated with a content item currently played through the physical storage medium 104 by the first electronic device 102, may be communicated to the server 114. The playback of the content item may be resumed on login to the unique user account from the second electronic device 112 (FIG. 1) from a last view state of the content item played through the physical storage medium 104 by the first electronic device 102.

In accordance with an embodiment of the disclosure, a server, such as the server 114 (FIG. 1) to control playback of digital content, is disclosed. The server 114 may comprise one or more circuits (hereinafter referred to as the processor 302) configured to receive a request for pairing from the first electronic device 102 using an interface of the server 114. The processor 302 may be configured to communicate a pairing code to the first electronic device 102 to enable pairing of the first electronic device 102 associated with a physical storage medium 104 with a unique user account in the server 114. The processor 302 may be further configured to receive user viewing information from the first electronic device 102. The user viewing information may be associated with a content item played through the physical storage medium 104 by the first electronic device 102. The processor 302 may be further configured to stream the content item to the second electronic device 112 on login to the unique user account from the second electronic device 112. The content item is streamed to enable resuming playback of the content item on the second electronic device 112 from a last view state of the content item played through the physical storage medium 104 by the first electronic device 102.

Various embodiments of the disclosure may provide a physical storage medium, such as non-transitory machine readable medium, stored thereon, a set of instructions executable by a machine, such as the first electronic device 102, to control playback of digital content. The set of instructions may cause the machine and/or the first electronic device 102 to perform the operations that comprise pairing of the first electronic device 102 associated with the physical storage medium 104 with a unique user account in the server 114, using the application 106 embedded in the physical storage medium 104. User viewing information, associated with a content item currently played through the physical storage medium 104 by the first electronic device, may be communicated to the server 114. Further, playback of the content item may be resumed on login to the unique user account from the second electronic device 112 from a last view state of the content item played through the physical storage medium 104 by the first electronic device 102.

The present disclosure may be realized in hardware, or a combination of hardware and software. The present disclosure may be realized in a centralized fashion, in at least one computer system, or in a distributed fashion, where different elements may be spread across several interconnected computer systems. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A first electronic device, comprising:
   circuitry configured to:
   control a display device to display a unique pairing code and a user input field to enter said displayed unique pairing code, wherein said unique pairing code is displayed adjacent to said user input field on a same display screen of said display device;
   pair, based on said unique pairing code, said first electronic device with a unique user account in a server, via an application embedded in a physical storage medium; and
   communicate, to said server, user viewing information at periodic intervals based on a change in said user viewing information to periodically update said user viewing information at said server, wherein
   said user viewing information is associated with a first content item that is currently played through said physical storage medium by said first electronic device, and
   upon login to said unique user account from a second electronic device, a streaming playback of said first content item is resumed from a last view state of said first content item based on said updated user viewing information.

2. The first electronic device according to claim 1, wherein said first electronic device corresponds to at least one of a Blu-Ray Disc (BD) player, a media player device, or a gaming device.

3. The first electronic device according to claim 1, wherein said circuitry is further configured to receive said unique pairing code from said server.

4. The first electronic device according to claim 3, wherein
   said circuitry is further configured to control said display device to display said received unique pairing code on said same display screen of said display device through said application embedded in said physical storage medium, and
   said display device is communicatively coupled to said first electronic device.

5. The first electronic device according to claim 1, wherein
   said circuitry is further configured to generate said user viewing information associated with said first content item played through said physical storage medium at determined time intervals,
   said generated user viewing information is periodically communicated to said server to update said user viewing information for said unique user account at said server.

6. The first electronic device according to claim 1, wherein
   said user viewing information comprises at least one of a first electronic device identifier (ID), an ID of said first content item, an ID of said physical storage medium, a timestamp, a viewing session value, view state information, current timing information associated with said first content item currently played through said physical storage medium, or at least one viewing progress value,
   said at least one viewing process value is based on a user input, and
   said user input corresponds to at least one of a start event, a pause event, a fast forward event, a rewind event, or a stop event.

7. The first electronic device according to claim 1, wherein said circuitry is further configured to play a new content item received from said server through said physical storage medium, based on a dynamic update of said application embedded in said physical storage medium.

8. The first electronic device according to claim 7, wherein said new content item, received from said server, comprises at least one of a dynamic advertising content, a promotional content, menu update information, or a second content item that is different from said first content item stored in said physical storage medium.

9. The first electronic device according to claim 7, wherein said circuitry is further configured to play said new content item via at least one graphical placeholder on an interface of said application embedded in said physical storage medium.

10. The first electronic device according to claim 1, wherein said circuitry is further configured to update menu items of a menu navigation system of said application embedded in said physical storage medium based on instructions received from said server.

11. A server, comprising:
  circuitry configured to:
    receive a request to pair from a first electronic device via an interface of said server, wherein said request to pair comprises a unique user account in said server;
    communicate a unique pairing code to said first electronic device to pair said first electronic device with said unique user account in said server, wherein said first electronic device is associated with a physical storage medium;
    receive a user input from said first electronic device based on said communicated unique pairing code; wherein
      said unique pairing code and a user input field to enter said unique pairing code as said user input are displayed adjacently on a same display screen of a display device, and
      said display device is communicatively coupled to said first electronic device;
    receive, from said first electronic device, user viewing information at periodic intervals based on a change in said user viewing information,
    wherein said user viewing information is associated with a first content item played through said physical storage medium by said first electronic device; and
    stream said first content item to a second electronic device upon login to said unique user account from said second electronic device to resume a playback of said first content item on said second electronic device from a last view state of said first content item played through said physical storage medium by said first electronic device.

12. The server according to claim 11, wherein said circuitry is further configured to generate said unique pairing code to communicate to said first electronic device to pair said server with said first electronic device.

13. The server according to claim 11, wherein
  said circuitry is further configured to communicate a response to said first electronic device, and
  said response corresponds to a pairing status of said first electronic device with said server.

14. The server according to claim 11, wherein said circuitry is further configured to communicate a new content item to said first electronic device to remotely update an application embedded in said physical storage medium of said first electronic device to enable playback of said new content item through said physical storage medium of said first electronic device.

15. The server according to claim 14, wherein said new content item communicated to said first electronic device comprises at least one of a dynamic advertisement, a promotional content, menu update information, or a second content item different from said first content item stored in said physical storage medium of said first electronic device.

16. The server according to claim 11, wherein said circuitry is further configured to determine a usage pattern associated with said physical storage medium based on said received user viewing information from said first electronic device.

17. The server according to claim 11, wherein said circuitry is further configured to communicate instructions to said first electronic device to update a menu navigation system of an application embedded in said physical storage medium.

18. A method, comprising:
  in a first electronic device:
    controlling a display device to display a unique pairing code and a user input field to enter said displayed unique pairing code, wherein said unique pairing code is displayed adjacent to said user input field on a same display screen of said display device;
    pairing, based on said unique pairing code, said first electronic device with a unique user account in a server, via an application embedded in a physical storage medium; and
    communicating, to said server, user viewing information at periodic intervals based on a change in said user viewing information to periodically update said user viewing information at said server, wherein
      said user viewing information is associated with at least one content item currently played through said physical storage medium by said first electronic device, and
      upon login to said unique user account from a second electronic device, a streaming playback of said at least one content item is resumed from a last view state of said content item based on said updated user viewing information.

19. A method, comprising:
  in a server:
    receiving a request for pairing from a first electronic device via an interface of said server, wherein said request for pairing comprises a unique user account in said server;
    communicating a unique pairing code to said first electronic device to enable pairing of said first electronic device with said unique user account in said server, wherein said first electronic device is associated with a physical storage medium;
    receiving a user input from said first electronic device based on said communicated unique pairing code; wherein
      said unique pairing code and a user input field to enter said unique pairing code as said user input are displayed adjacently on a same display screen of a display device, and
      said display device is communicatively coupled to said first electronic device;
    receiving, from said first electronic device, user viewing information at periodic intervals based on a change in said user viewing information, wherein said user viewing information is associated with at least one content item played through said physical storage medium by said first electronic device; and streaming said at least one content item to a second electronic device upon login to said unique user account from said second electronic device to enable resuming playback of said at least one content item on said second electronic device from a last view state of said at least one content item played through said physical storage medium by said first electronic device.

20. A non-transitory computer-readable medium having stored thereon computer-executable instructions that, when executed by a processor in a first electronic device, cause said processor to execute operations, said operations comprising:

controlling a display device to display a unique pairing code and a user input field to enter said displayed unique pairing code, wherein said unique pairing code is displayed adjacent to said user input field on a same display screen of said display device;

pairing, based on said unique pairing code, said first electronic device with a unique user account in a server, via an application embedded in a physical storage medium; and communicating, to said server, user viewing information at periodic intervals based on a change in said user viewing information to periodically update said user viewing information at said server, wherein said user viewing information is associated with at least one content item currently played through said physical storage medium by said first electronic device, upon login to said unique user account from a second electronic device, a streaming playback of said at least one content item is resumed from a last view state of said at least one content item based on said updated user viewing information.

* * * * *